United States Patent

Forshee

[15] 3,638,992

[45] Feb. 1, 1972

[54] AUTO AND AIRCRAFT SAFETY LINERS

[72] Inventor: Lloyd T. Forshee, 1219 Fischer Drive, Saginaw, Mich. 48601

[22] Filed: Dec. 2, 1969

[21] Appl. No.: 870,321

[52] U.S. Cl...........................296/39 R, 52/309, 244/119 R, 280/150 B
[51] Int. Cl......................................................B62d 25/00
[58] Field of Search..........................296/31, 31 P, 39, 39 A; 280/150 B; 52/403, 309; 206/46 FR; 244/119 R

[56] References Cited

UNITED STATES PATENTS

| | | | |
|---|---|---|---|
| 2,006,232 | 6/1935 | Upson | 296/31 X |
| 2,142,463 | 1/1939 | Upson | 296/137 A |
| 3,188,112 | 6/1965 | Oelkrug | 280/150 B |
| 3,396,070 | 8/1968 | Gambill et al | 296/39 X |

FOREIGN PATENTS OR APPLICATIONS

| | | | |
|---|---|---|---|
| 865,977 | 4/1961 | Great Britain | 296/137 A |

*Primary Examiner*—Leo Friaglia
*Assistant Examiner*—John A. Pekar
*Attorney*—Learman & McCulloch

[57] ABSTRACT

A liner bonded to the inner side of a vehicle body so to aid in protecting passengers against hard impact therewith during a collision or violent movement of the vehicle, the liner comprising a foam sheet which may be variously designed so to include air pockets for additionally absorbing shock.

5 Claims, 6 Drawing Figures

PATENTED FEB 1 1972 3,638,992

INVENTOR
LLOYD T. FORSHEE

AUTO AND AIRCRAFT SAFETY LINERS

This invention relates generally to vehicle bodies. More specifically it relates to impact shock absorbing devices in automotive and aircraft vehicles.

A principal object of the present invention is to provide a liner for the inner wall surface of an airplane or automotive vehicle, the liner having self-contained means to protect passengers against hard impact therewith in the event of a collision or violent movement of the vehicle.

Another object is to provide a liner which can be readily installed on inner wall surfaces of a roof, doors or other areas of the vehicle body.

Another object is to provide a liner made of foamed material, and which may be variously modified to include air pockets to further absorb shocks.

Other objects are to provide an auto and aircraft safety liner which is simple in design, inexpensive to manufacture, rugged in construction, easy to use and efficient in operation.

These and other objects will be readily evident from the following specification and the accompanying drawing wherein.

Figure 1:
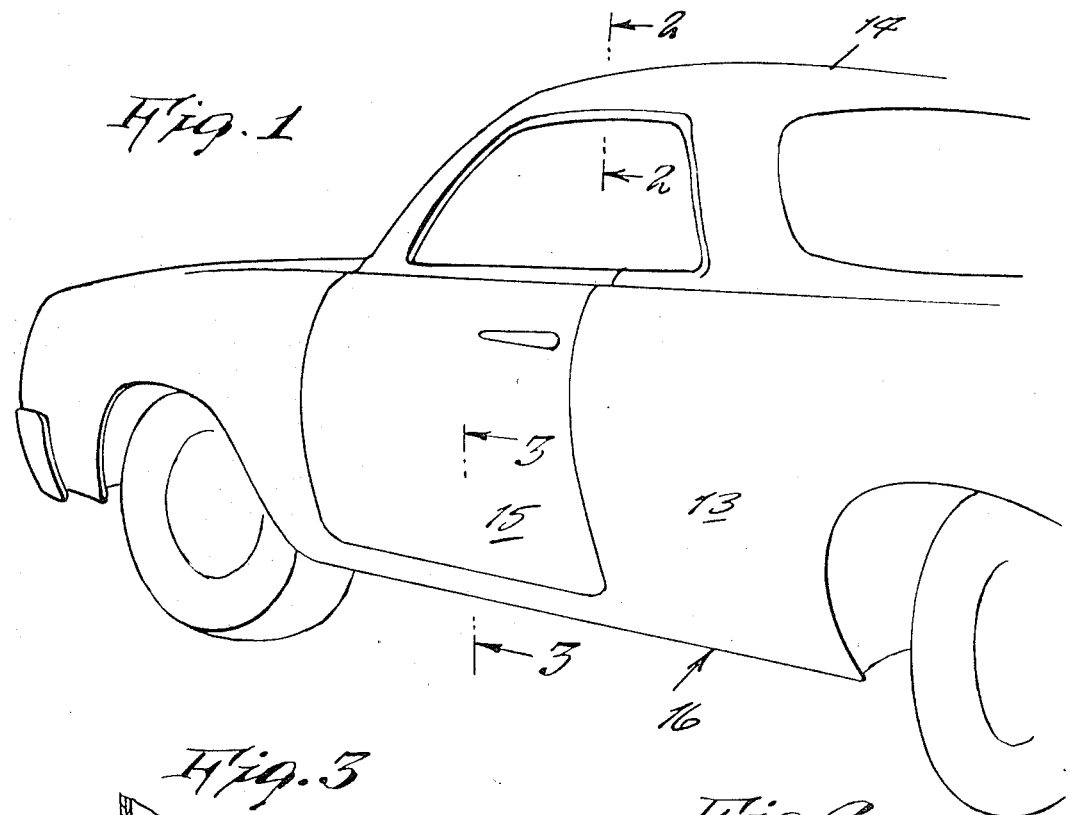
FIG. 1 is a perspective view of a vehicle incorporating the present invention.
Figure 3:
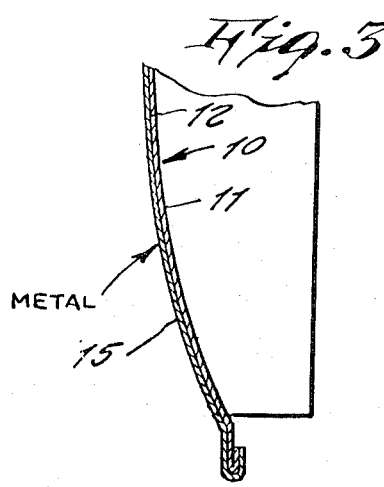
FIG. 3 is a cross-sectional view on line 3—3 of FIG. 1 showing a door section.
Figure 2:
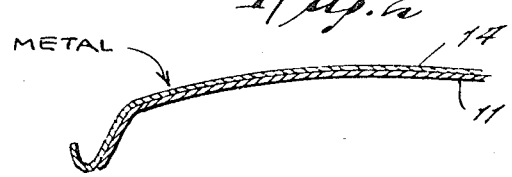
FIG. 2 is a cross-sectional view on line 2—2 of FIG. 1 showing a roof portion.

Referring now to the drawing in detail, and more particularly to FIGS. 1 to 3, the reference numeral 10 represents a vehicle safety liner according to the present invention, wherein the liner comprises a foamed styrene or the like sheet 11 that is bonded to an inner surface 12 of a wall 13, roof 14, or door 15 of an airplane or automobile 16. The foam sheet has a spongy or soft character for cushioning a shock in case of violent impact against a passenger.

Figure 4:
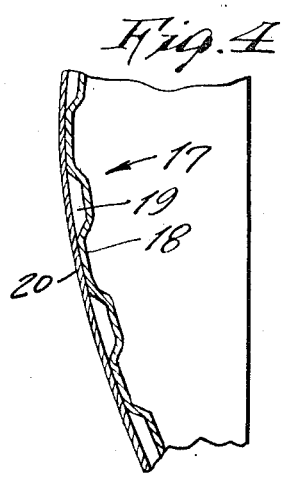
FIG. 4 is a view similar to FIG. 3 showing a modified design of the invention.

In FIG. 4, a modified liner 17 is shown which comprises a foam sheet 18 irregularly deformed to one side to provide spaced-apart air pockets 19 therebetween and a metal surface 20 to which it is bonded.

Figure 5:
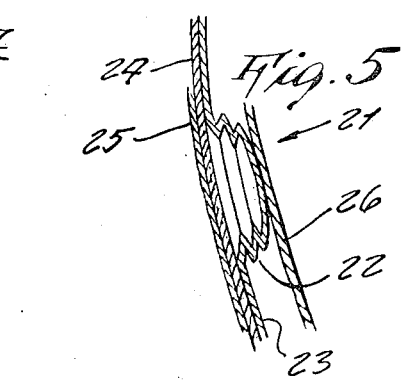
FIG. 5 is a view similar to FIG. 4 showing a further modified design.

In FIG. 5, another modified liner 21 is shown wherein the pockets 22 are of bellows configuration so that the pocket is axially collapsible thus improving cushioning characteristics.

In this construction the foam sheet 23 is deformed to one side to produce the pockets is located between a flat, foam sheet 24 bonded to the metal surface 25, and a flat metal or vinyl sheet 26.

Figure 6:
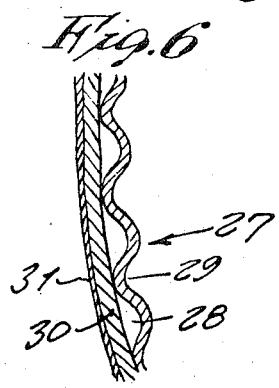
FIG. 6 is a view similar to FIG. 5 showing a still further modified design.

In FIG. 6, a further modified liner 27 is shown wherein pockets 28 are formed in a foamed sheet sheet 29 located on one side of a foam sheet 30 bonded to metal, plastic or other material surface 31.

Thus there is provided a liner for protecting passengers in a violent impact.

While various changes may be made in the details of construction, it is understood that such changes will be within the spirit and scope of the present invention.

I claim:

1. A safety liner for a vehicle having a wall, said liner comprising a first sheet of soft, spongy material overlying said wall, said sheet being deformed to one side thereof at spaced intervals to form spaced-apart, cup-shaped air pockets therein; means securing said sheet to said wall; and a second sheet overlying said first sheet and being spaced from the latter by said pockets.

2. The construction set forth in claim 1 wherein said second sheet is flat.

3. The construction set forth in claim 1 wherein the means securing said first sheet to said wall comprises a flat sheet interposed between and bonded to said wall and said first sheet.

4. The construction set forth in claim 3 wherein said flat sheet is formed from soft, spongy material.

5. The construction set forth in claim 1 wherein said pockets have a bellows configuration.

* * * * *